United States Patent Office 2,830,090
Patented Apr. 8, 1958

2,830,090
PRODUCTION OF ALCOHOLS AND ETHERS

John W. Teter, Chicago, John L. Gring, Homewood, and William P. Hettinger, Jr., Dolton, Ill., and Carl D. Keith, Munster, Ind., assignors to Sinclair Refining Company, New York, N. Y., a corporation of Maine No Drawing. Application June 10, 1955
Serial No. 514,699

4 Claims. (Cl. 260—614)

This invention relates to the hydration of mono-olefins and to the conversion of alcohols to ethers. More particularly, this invention employs certain solid catalytic materials in the hydration of $C_2$ to $C_4$ mono-olefins to obtain the oxygen-containing products, alcohols, ethers or their mixtures; and in the conversion of $C_2$ to $C_4$ alcohols to obtain ethers either through alcohol dehydration or condensation of alcohol and mono-olefin. Specifically, the catalysts employed in the reactions of the present invention are the permanganates, aluminates and silicates of metals of the iron transition group, group I–B and group II–B.

It is known that low molecular weight mono-olefins can be converted to the corresponding alcohols and ethers by contact with water in the presence of various catalytic materials. The reaction products, which can contain predominantly alcohol or ether and usually at least a small proportion of each as well as various amounts of olefin polymer, are particularly useful as gasoline blending agents to obtain fuels of higher octane rating. In this reaction olefins are in part hydrated to alcohols which may in turn at least in part be dehydrated to ethers or combined with olefin feed to form ethers but over all it can be considered that this is a hydration reaction. It is also known that low molecular weight alcohols can be dehydrated to obtain ethers. The water released in this reaction can combine with olefin if present to form alcohols. Should olefin be present in this latter reaction it could also form by condensation with alcohol. As an over-all process the olefin feeds are hydrated by contact with water over the catalytic material to obtain ether, alcohol or their mixtures, and after separation of any excess water the amount of ether produced in the alcohol or the mixed products can be increased by conversion over similar type catalysts.

Common sources of olefin feed for these reactions are the relatively pure olefin materials and mixed streams such as the petroleum refinery streams containing propylene and butylenes, both normal and isobutylene, and a substantial amount of $C_3$ or $C_4$ paraffins. A particular stream which can be employed contains from about 50 to 75 volume percent of propylene with the remaining being substantially propane. In the hydration and alcohol conversion reactions, various solid catalysts are known to be effective and can be disposed in a fixed bed or employed in slurry form either on a batch or a continuous basis. In this reaction the water and olefin can be present as liquids or vapors depending upon the particular reaction conditions employed. A principal utility for the products of these reactions is as a gasoline blending component.

The present invention is concerned with these reactions in which certain catalysts are particularly effective. These catalysts include the permanganates, aluminates and silicates of the metals of the iron transition group, group I–B and group II–B and mixtures of these salts. The catalysts are employed in the reaction in the solid form either as a fixed bed or slurried with the reactants. The solid catalytic particles can consist entirely of the active catalytic compounds or they can be supported on inorganic carriers normally considered to be inert such as pumice, kieselguhr, diatomaceous earth, clays, silica, alumina, etc. Small amounts of other promoting agents can also be employed in the catalyst of this invention. When employing the catalyst on inert supports the active component will usually comprise from about 5 to 50 weight percent of the catalyst mass. Although the catalysts have been indicated as salts it may well be that the cationic metal component and the acid portions of these salts exist either in uncombined form with the cationic metal being present as an oxide or in some combined form other than as a salt. However, in this invention to obtain the desired effect the catalyst must be comprised of the acid component and sufficient of the cationic metal component to afford on the basis of theoretical combination a catalytic amount of the salt. Even though it is not definitely proven that the metal catalysts of this invention exist in the reaction as salts, it is believed that catalyst preparation conditions and the amount of cationic metal oxide present lead to the conclusion that salts are formed.

In the hydration of the low molecular weight mono-olefins and the conversion of $C_2$ to $C_4$ alcohols it is known that the selection of reaction conditions controls the relative amounts of ether and alcohol in the reaction products. When employing the catalysts of the present invention the reaction temperatures for the hydration of the $C_2$ to $C_4$ mono-olefins will generally vary between about 100 to 375° C. with the reaction pressure being within the range from about 15 to 3000 p. s. i. g. or more. In converting the $C_2$ to $C_4$ alcohols to ethers similar reaction temperatures are employed; however, the pressure varies from about atmospheric to 1500 p. s. i. g. or more. In this reaction higher temperatures are preferred and when no olefin is present to react with water released in forming ether from alcohol, pressures as low as atmospheric are employed. However, when such olefin is present higher pressures generally produce a greater conversion of any olefin present. In both the hydration and alcohol conversion reactions space velocities of about .1 to 5 WHSV (weight of olefin per weight of catalyst per hour) are generally employed. In any event the catalyst is present in an amount sufficient to exhibit a substantial catalytic effect.

The reaction condition which has the most effect upon the distribution of ether and alcohol in the product of the olefin hydration reaction is the water to olefin ratio. For increased alcohol formation the molar ratio of water to olefin is at least 1 to 1 with increased amounts of water assuring a larger formation of alcohol. When ether formation is to be increased the molar ratio of water to olefin is decreased and in particular is less than 0.5 to 1 and can be as low as 0.1 to 1 or less. In the alcohol conversion reactions ether formation can be increased by maintaining an alcohol to olefin molar ratio of at least 1 to 1; of course there need be no olefin present in the reaction.

The present invention will be illustrated further by the following examples which are not to be considered limiting.

Example 1

150 grams (dry basis) of $SiO_2$ 30% $Al_2O_3$ hydrogel is placed in a tank and sufficient deionized $H_2O$ is added to allow efficient stirring. To this slurry, with continued stirring, is simultaneously added 200 ml. of filtered sodium aluminate solution containing 46.4 grams of $NaAlO_2$ and 100 ml. of nickel chloride solution containing 67.3 grams of $NiCl_2 \cdot 6H_2O$. The sodium aluminate solution is added at a rate of 20 ml. per minute and the nickel chloride solution is added at a rate of 10 ml. per minute. After the solutions have been added the slurry is stirred 10 minutes and filtered. The filter cake is washed several times with deionized $H_2O$, by the slurry-filtering technique, until the wash water gives a negative chloride test. The washed filter cake is dried at 120° C., ground to pass 20 mesh, mixed with 2% graphite and tabletted as 1/8" diameter x 1/16" long tablets. These tablets are calcined at 600° F. in a muffle furnace.

*Example II*

160 grams (dry basis) of an alumina hydrate which consists of 30% aluminum trihydrate and 70% boehmite plus amorphous alumina hydrate (based on X-ray diffraction analysis of 110° C. dry hydrate) is dried at 120° C., ground to pass 50 mesh and calcined 6 hours at 900° F. This material is placed in a 1 liter fluted glass flask fitted with a stirrer, heating mantle and condenser, and 500 ml. of deionized $H_2O$ is added. With stirring, the slurry is heated to 180° F. While continuing to stir, 17.8 grams (dry basis) of freshly washed $SiO_2$ hydrogel is added and immediately following this 35.3 grams of cobalt carbonate (49.5% Co) is added. The resulting slurry is heated at 180° F., with stirring, for 6 hours. After the digestion is completed, the slurry is filtered, and the filter cake is dried at 110° C. The dry cake is ground to pass 20 mesh, mixed with 2% graphite and tabletted as 1/8" diameter x 1/16" long tablets. These tablets are calcined at 600° F. in a muffle furnace.

*Example III*

140 grams (dry basis) of an aluminum hydrate which consists of 85% aluminum trihydrate and 15% boehmite plus amorphous alumina hydrate (based on X-ray diffraction analysis of 110° C. dry hydrate) is dried at 120° C., ground to pass 50 mesh, and calcined 6 hours at 800° F. The resulting gamma-alumina is placed in a tank and sufficient deionized $H_2O$ is added to allow efficient stirring. To this slurry with continued stirring is simultaneously added approximately 500 ml. of filtered sodium metasilicate solution containing 122.2 grams of $$Na_2SiO_3 \cdot 9H_2O$$

and 150 ml. of cupric chloride solution containing 73.3 grams of $CuCl_2 \cdot 2H_2O$. The sodium silicate solution is added at a rate of approximately 50 ml. per minute and the cupric chloride solution is added at a rate of 15 ml. per minute. After the solutions have been added the slurry is heated to 160° F. and held for 30 minutes. The slurry is then filtered and the filter cake is washed several times with deionized $H_2O$, by the slurry-filter technique, until the wash water gives a negative chloride test. The washed filter cake is dried at 120° C. and ground in a hammer mill. The resulting powder is mixed with sufficient water in a Simpson mixer to give a plastic mass of extrusion consistency. This mix is extruded through a 1/16" diameter and the extrudate is dried at 120° C. The dry extrudate is broken up to less than 1/4" lengths and calcined at 3 hours at 500° F. in a muffle furnace.

*Example IV*

160 grams (dry basis) of silica 30% $Al_2O_3$ hydrogel are placed in an evaporating dish and an aqueous solution of zinc permanganate containing 54.2 grams of $$Zn_2(MnO_4)_2 \cdot 6H_2O$$

are added. The mixture is kneaded until homogeneous and dried at 120° C. The dry cake is ground to pass 20 mesh, mixed with 2% graphite and tabletted as 1/8" diameter x 1/16" long tablets. These tablets are calcined at 400° F. in a muffle furnace.

Each of the catalysts of Examples I to IV is effective in promoting the hydration and alcohol conversion reactions of the present invention. For instance, 50 grams of the catalyst of Example I are placed in a tubular downflow reactor surrounded by a radiant heat furnace and likewise 50 grams of each of the catalysts of Examples II to IV are placed, respectively, in separate similiar downflow reactors. To each reactor is passed a $C_3$ petroleum refinery stream containing about 65 weight percent propylene with the remaining being substantially propane at the rate of about 50 grams per hour and water at the rate of 15 grams per hour is combined with the refinery gas stream passing to the reactor. The hydration reaction temperature is maintained at 525° F. and a pressure of 1200 p. s. i. g. The effluent stream from the reactor includes isopropyl alcohol, isopropyl ether, unreacted olefin, propane and excess water.

Similarly, each of the catalysts of Examples I to IV is employed in the conversion of isopropyl alcohol to isopropyl ether. In these systems a mixture of isopropyl alcohol and isopropyl ether is passed to the reactors containing the catalyst at a temperature of 450° F. and 300 p. s. i. g. and in each case the effluent product is substantially increased in ether content as compared with the feed to the reactors.

It is claimed:

1. The method of converting mono-olefin containing 2 to 4 carbon atoms to alcohols and ethers which comprises hydrating olefin with water while in contact with a catalytic amount of a member selected from the group consisting of the permanganates, aluminates and silicates of metals of the iron transition group, group I–B and group II–B.

2. The method of claim 1 in which the olefin is propylene.

3. The method of producing ether from alcohol containing 2 to 4 carbon atoms which comprises converting alcohol while in contact with a catalytic amount of a member selected from the group consisting of the permanganates, aluminates and silicates of metals of the iron transition group, group I–B and group II–B.

4. The method of claim 3 in which the alcohol is isopropyl alcohol.

References Cited in the file of this patent

UNITED STATES PATENTS

| | | |
|---|---|---|
| 1,999,620 | Peski et al. | Apr. 30, 1935 |
| 2,055,269 | Peski et al. | Sept. 22, 1936 |
| 2,148,140 | Tropsch | Feb. 21, 1939 |